US012689189B2

(12) United States Patent
Henning

(10) Patent No.: US 12,689,189 B2
(45) Date of Patent: Jul. 21, 2026

(54) ELECTRICAL DISTRIBUTION BOX

(71) Applicant: tigerexped GmbH & Co. KG, Alpen (DE)

(72) Inventor: Martin Henning, Alpen (DE)

(73) Assignee: tigerexped GmbH & Co. KG, Alpen (DE)

( * ) Notice: Subject to any disclaimer, the term of this patent is extended or adjusted under 35 U.S.C. 154(b) by 358 days.

(21) Appl. No.: 18/684,861

(22) PCT Filed: Jun. 15, 2022

(86) PCT No.: PCT/EP2022/066430
§ 371 (c)(1),
(2) Date: Feb. 20, 2024

(87) PCT Pub. No.: WO2023/025429
PCT Pub. Date: Mar. 2, 2023

(65) Prior Publication Data
US 2024/0356313 A1     Oct. 24, 2024

(30) Foreign Application Priority Data

Aug. 26, 2021     (DE) .......................... 202021104610.4

(51) Int. Cl.
H02B 1/48          (2006.01)
H01R 33/95       (2006.01)
(Continued)

(52) U.S. Cl.
CPC .............. H02B 1/48 (2013.01); H01R 33/95 (2013.01); H02B 1/20 (2013.01); H02G 3/16 (2013.01)

(58) Field of Classification Search
None
See application file for complete search history.

(56) References Cited

U.S. PATENT DOCUMENTS 5,808,351 A * 9/1998 Nathan ..................... G01R 1/04
                                                           257/665
6,225,652 B1 * 5/2001 Devanney ........... H10W 20/494
                                                           257/209
(Continued)

FOREIGN PATENT DOCUMENTS

CH            279 075 A        2/1952
CN       307169216 S        3/2022
(Continued)

OTHER PUBLICATIONS

International Search Report for PCT Application No. PCT/EP2022/066430, Dated Oct. 27, 2022.
(Continued)

*Primary Examiner* — Courtney L Smith
(74) *Attorney, Agent, or Firm* — Westborough IP Group, LLC

(57)          ABSTRACT

An electrical distribution box includes a housing with contact devices so that a plurality of fuses are mountable in the housing and electroconductively connectable to the contact devices. The electrical distribution box allows the connection of a large number of electrical devices with a small distribution box size. The housing has a round or oval basic shape in plan view with a bent housing periphery that is curved or polygonal. First contact devices are arranged at intervals from one another along the bent housing periphery, each the first contact device being assigned a second contact device which is displaced towards the center of the housing, so that a fuse is connectable to one of the first contact devices and the assigned one of the second contact devices.

20 Claims, 9 Drawing Sheets

(51) Int. Cl.
    *H02B 1/20*         (2006.01)
    *H02G 3/16*         (2006.01)

(56)            References Cited

U.S. PATENT DOCUMENTS

| | | | |
|---|---|---|---|
| 6,325,666 B1 * | 12/2001 | Robinson | H01R 33/97 |
| | | | 439/517 |
| 10,153,565 B2 * | 12/2018 | Zhao | H01R 9/226 |
| 11,557,565 B2 * | 1/2023 | Tang | H10W 70/417 |
| 2006/0164797 A1 | 7/2006 | Korczynski | |
| 2007/0270045 A1 | 11/2007 | Korczynski et al. | |
| 2013/0157502 A1 | 6/2013 | Sittenauer | |
| 2013/0293341 A1 * | 11/2013 | Krause | H01H 85/47 |
| | | | 337/187 |

FOREIGN PATENT DOCUMENTS

| | | | |
|---|---|---|---|
| DE | 10 38 146 B | 10/1956 | |
| DE | 20 2010 003 456 U1 | 12/2010 | |
| DE | 10 2009 036 559 A1 | 2/2011 | |
| DE | 10 2011 088 661 A1 | 6/2013 | |
| EP | 2756996 A1 * | 7/2014 | B60R 16/0238 |
| EP | 3 243 705 A1 | 11/2017 | |
| EP | 3 123 564 B1 | 9/2018 | |
| GB | 552 503 | 4/1943 | |
| WO | WO 2015/144910 A1 | 10/2015 | |

OTHER PUBLICATIONS

German Search Report for Application No. 20 2021 104 610.4, Dated Feb. 18, 2022.
International Preliminary Report for PCT Application No. PCT/EP2022/066430, Dated Mar. 7, 2024.

* cited by examiner a)                                        b)

c)                                        d)

ELECTRICAL DISTRIBUTION BOX

TECHNICAL FIELD

This application relates to a distribution box with a housing with contact devices, and more particularly to a distribution box with a housing with contact devices where a plurality of fuses are mountable in the housing and electroconductively connectable to the contact devices.

BACKGROUND

Electrical distribution boxes with fuses are used in particular in vehicles such as motorhomes or motorboats and are used to contain fuses and to connect the ground cables and positive cables of the batteries and the electrical loads in the vehicle. The distribution boxes are often also referred to as fused distribution blocks or fuse boxes. The cables of the batteries and loads are connected to the distribution box via the contact devices, usually contact bolts or contact terminals, and connected to each other via the fuses arranged in the distribution box. The distribution box may have other electrical components, such as LEDs, i.e. light-emitting diodes, which light up when one of the fuses fails.

A distribution box of this type is known, for example, from publication EP 3 123 564 B1. The distribution box has a rectangular basic shape and has several contact bolts that are connectable to electrical conductors (cables). The contact bolts are either connected to cables via a cable lug attached to the cable or to a circuit board via a plug connection, where the circuit board connects several of the contact bolts to each other. Overall, the distribution box from publication EP 3 123 564 B1 has contact devices for four fuses and is therefore used to connect four electrical devices.

SUMMARY OF THE INVENTION

It is desirable to allow the connection of a large number of electrical devices with a small distribution box size. Furthermore, the distribution box should be cost-effective, and the amount of material required, in particular electrical conductor material, should be kept to a minimum, with a high level of safety being the aim.

In the system described herein, the housing has an at least partially round or oval basic shape in plan view with a bent housing periphery that is curved or polygonal, and first contact devices are arranged at intervals from one another along the bent housing periphery, each first contact device being assigned a second contact device which is displaced towards the center of the housing, so that a fuse is connectable to the first and the assigned second contact device.

In other words, the circumferential periphery of the round or oval housing is round, oval or polygonal in plan view or consists of adjacent rounded periphery sections, with a plurality of contact devices being arranged along the bent periphery of the housing. The contact devices lie on a line along the periphery of the housing and are arranged equidistantly from one another in at least a partial area of the housing at a distance which enables simple and safe handling, in particular when cables are connected to the external contact devices via cable lugs. The cables connected to the contact devices can extend from outside the distribution box radially, i.e. at right angles to the periphery. The fuses extend from the external contact devices radially inwards, i.e. at right angles to the periphery towards the center of the housing. Due to the essentially star-shaped arrangement of the fuses in the housing, the fuses can be fitted in a very space-saving manner. The second contact of several fuses, located towards the center of the housing, may be combined using a conductor rail. Since the contacts of the fuses arranged in a star shape with respect to the center of the housing are particularly close to each other in the center, it is possible to combine the contacts at a common voltage potential with little material usage and in a small space. The outer contact devices to which the fuses arranged in a radial pattern are connected, on the other hand, are at a greater distance from each other and allow easy and secure attachment of the cable lugs of the cables leading to the power sources or loads. At least one group of several fuses may be arranged in a star shape and each attached to a contact device located near the periphery of the housing and near the center of the housing. With other fuses, in particular flat plug-in fuses, the space requirement is not so critical. Here, the fuses may be connected to the cables of the loads with simple contact terminals. However, the radial and thus star-like arrangement in the housing is also advantageous for flat plug-in fuses, because plug-in sockets with radial alignment may be arranged in the housing to save space and may be connected to contact terminals on the periphery of the housing via corresponding conductor paths, with positive and ground contacts always alternating, so that an adjacent pair of terminals is used for the positive and ground connection of a load.

For small variants, it may also be sufficient if the housing has a partially round or oval basic shape and corresponds to a segment or section of a circle or an ellipse in plan view. Here too, the advantageous effect of the compact arrangement of the contact devices and the orderly feed of the connection cables in a star-shaped arrangement towards the periphery of the housing may be achieved by arranging a plurality of contact devices along the bent periphery of the housing. The first contact devices may also only be arranged over part of the length of the bent periphery. In the embodiments described below, for example, groups of different contact devices are provided at different distances from one another and also at different distances from the periphery, with each group extending only over part of the bent periphery of the housing.

The distribution box may be mounted at a central location in the vehicle's electrical system, and all connected electrical cables run in a star configuration towards the housing of the distribution box. In this way, it is possible to arrange a large number of electrical cables on the distribution box with a small size, while avoiding the risk of the connected cables crossing each other or interfering in any other way.

The distances between the contact devices may be regular, where different groups of contact devices may have different distances depending on the components to be connected, a position of the components or a design of the components.

Instead of the very compact circular shape, the housing may also have a polygonal shape with short straight periphery sections viewed in plan view. In practice, the length of each straight section of the housing periphery may essentially correspond to the distance between two adjacent contact devices, and one contact device may be arranged in the middle of each straight section.

Depending on local conditions, the housing shape may also deviate from the basic round shape and be oval. It is also possible to provide an elongated housing with two semi-circular periphery sections, between which two straight sections of equal length are arranged. In this case too, contact devices may be arranged at regular intervals around the semi-circular bent periphery sections in a space saving manner, where second contact devices are provided that are displaced radially inwards so that a fuse can be fitted between each outer first and inner second contact device. The contact devices may also be arranged at regular intervals in the straight sections between the peripheries.

The rounded housing shape has several advantages. For example, contact devices with the same potential, i.e. ground contacts on the one hand and positive contacts on the other, may be attached to plate-shaped busbars in the interior of the housing, which electroconductively connect the contact devices to each other. The use of busbars for contacts of one potential is known in distribution boxes. In the present case, it is proposed to use flat plate-shaped components made of electroconductive material as busbars, which extend inside the bent periphery of the housing and have a small thickness and surface area and consequently a low mass. With the current high price of copper, a weight saving compared to conventional straight busbars means considerable cost savings. The central area of the housing may additionally be used to hold spare parts, e.g. spare fuses, provided that no contact devices are arranged in the central area to which cables or fuses are to be connected.

As already mentioned, the periphery of the housing may have at least one of the following properties:

the periphery of the housing is round in plan view:
the periphery of the housing is oval in plan view:
the periphery of the housing is polygonal in plan view:
the periphery of the housing has straight sections opposite each other in which several contact devices are arranged.

The options for the bent periphery profile are described above. With an oval housing contour, the length is greater than the width and the length being greater than the width is preferable in cases where the installation space available for the housing is large in one direction and small in the perpendicular direction. The same applies to a housing contour consisting of two semicircles and a rectangle arranged between the semicircles, the height of which corresponds to the diameter of the semicircles. With the variants, too, the curvature of significant areas of the housing periphery results in a considerable reduction in the surface area of the housing due to the fact that the fuses in the bent peripheral areas project radially from the contact device near the housing periphery towards the center of the housing.

In practice, the distribution box may include further components, for example an electrical jumper that connects several contact devices with each other. LEDs may also be arranged in the housing. One LED (light-emitting diode) may be connected in parallel to each fuse and light up when the fuse fails. This is a convenient way of indicating to the user that a fuse needs to be replaced or a connected device needs to be checked.

As mentioned, at least one plate-shaped busbar may be arranged in the housing, the outer periphery of which follows the periphery of the housing, and which is electro-conductively connected to contact devices at predetermined intervals along a periphery of the housing. The busbar extends over a section of the basic contour of the housing in plan view and has a small thickness. The busbar fulfills the same function as busbars in conventional distribution boxes by connecting contact devices with the same voltage potential. The busbar may have a first row of equidistant contact devices close to the outer periphery of the plate-shaped busbar and a second, inner row of equidistant contact devices at a second distance from the outer periphery of the busbar, which is greater than the first distance. The outer and inner contact devices may be offset from each other in the circumferential direction of the bent periphery of the housing. In this way, the number of connections to the busbar can be increased.

The smaller distance between the individual connections due to the additional connections is not a problem because all connections connected to the busbar have the same potential.

In practice, the distribution box may have at least one of the following:

a first busbar, which is configured to be connected to at least one ground cable of at least one battery:
a second busbar, which is configured to be connected to at least one ground cable of at least one load:
an electrical jumper that connects the first busbar and the second busbar.

The separation of battery ground and load ground potential allows for the measurement of the total current flowing between ground potential and positive potential via a shunt (low-resistance electrical measuring resistor). The measurement of the total current flowing between ground potential and positive potential is useful for battery management, in particular for determining the state of charge of the battery and for warning of a deep discharge. If a measurement of the total current flowing between ground potential and positive potential is not to be carried out, a jumper may be attached to a contact device of the first busbar and to a contact device of the second busbar and both busbars are connected electro-conductively. If, on the other hand, the measurement of the total current flowing between ground potential and positive potential is to be carried out, the battery ground is disconnected from the load ground and the connection is made via the measuring shunt, two contacts are each separately connected to one contact device of the first busbar and one contact device of the second busbar. In this case, an insulating strip may be attached between two neighboring contact devices that are connected to the first busbar on the one hand and the second busbar on the other. The insulating strip ensures that unwanted contact between the two busbars does not bridge the measuring shunt. The insulating strip is of course removed when the two neighboring contact devices are connected to each other via the jumper.

Depending on the design and size of the fuses, the contact devices may be designed differently. Contact terminals may be provided in the distribution box for smaller fuses that are designed as flat plug-in fuses. Standardized sockets or fuse holders are available for such flat plug-in fuses, into which the plug contacts of the flat plug-in fuses can be inserted.

So-called strip fuses or midi blade fuses have screw connectors, i.e. flat metal sections which are configured for insertion of a contact bolt or a contact screw and are clamped with a nut or the contact screw. The screw connection presses the respective metal section firmly against a busbar or another flat contact element, resulting in a low contact resistance.

In practice, the distribution box may also have at least one printed circuit board or conductor tab, which electroconductively connects the components arranged in the housing. Conductor tabs may be used to connect the external positive contacts of larger fuses with contact bolts or contact screws to which the positive cables to the batteries or loads are connected. Printed circuit boards, also known as PCBs, with conductor paths for connecting multiple components may be used to connect smaller components, for example fuse holders or control LEDs.

In practice, the housing may have a base plate and a removable cover. In many applications, the fuses should be arranged in a gas-tight manner. For this reason, the housing may have a seal between the base plate and the cover. The seal may seal the area of the base plate to which the fuses are attachable from the environment. When using a distribution box in an engine compartment, it may be required for safety reasons that the space containing the fuses is sealed gas-tight from the environment in order to prevent a flammable mixture from forming in the space with the fuses.

The cover may have a twist lock that can be locked to a receptor on the base plate and can be operated using a twist knob. Such a twist knob is easy to operate with one hand and enables the cover to be attached or removed quickly. The twist knob may be integrally connected to the cover if the cover is rotatably attached to the housing. In the case of a round housing shape, the cover may then have elastic snap-latching devices on the circumference of the cover, which secure the cover to the base plate. However, if the cover is intended to be fixed in a fixed rotational position, the twist knob may also be a separate component that protrudes through a hole in the cover and interacts with a receptor, for example in the manner of a bayonet catch, on the base plate. Additionally, a seal may be arranged in this case between the cover and the twist knob in order to seal the space for holding the fuses from the environment.

As explained above. LEDs may be arranged in the housing that light up when a fuse fails. To ensure that the LEDs are also visible from the outside, the cover may be made of transparent material. Additionally or alternatively, the cover may have at least one light conductor that extends into the housing with a free end is close to an LED. The light conductor can be formed by a pin molded onto the transparent material of the cover. The light conductor produces a light spot on the top of the cover when the LED assigned to the light conductor lights up. This makes it possible to identify which fuse is defective even when the cover is closed. The outside of the cover may be labeled and contain information about the rated current of the fuse and the connected load. When the cover is closed, the illuminated dot on the cover clearly indicates which of the loads is de-energized and which type of fuse must be used to replace the defective fuse.

The cover may also have at least one cover tab for a contact device in the area of the periphery of the housing. The cover tab may be attached to the cover via a predetermined breaking point. In practice, all contact devices in the area of the periphery of the housing may be covered by such cover tabs. Only when a cable is connected to a contact device is the cover tab of the contact device concerned removed. In this way, unused contact devices may be protected against unintentional contacting.

The base plate may have ribs made of insulating material between adjacent contact devices near the periphery of the housing. The ribs physically separate cable lugs connected to the contact devices from each other and prevent establishing undesired contact.

As explained above, the base plate may also have a coupling device to which an insulating strip between two contact devices may be attached. The insulating strip between the two contact devices may therefore be removed if the two contact devices are to be connected to each other using the jumper mentioned above. Alternatively, if the jumper is removed, the insulating strip may be arranged on the base plate to insulate the two contact devices from each other. The coupling device may be a simple hole in the base plate into which a pin can be inserted, which is arranged on a flat plastic strip.

Finally, the base plate may be made of plastic, in which at least one busbar, conductor tab or contact device is embedded. In practice, the base plate and the other plastic elements of the distribution box (cover, twist knob, cover plate) are manufactured from plastic by injection molding. The electroconductive elements such as the busbar, conductor tab or contact device can be inserted into the injection mold and encapsulated in plastic. As a result, the electroconductive elements are fixed to the plastic parts in a spatially unchangeable manner. In particular, the busbar, conductor tab or contact device may have threaded holes into which screws are screwed to form the contact bolts and may be inserted into the injection mold together with the screws. The screws are fixed to the electroconductive elements by overmolding with plastic.

The distribution box may also have at least one electrically insulating cover plate. On the front of the base plate of the housing, on which the fuses are mounted and which is covered by the cover, an insulating cover plate may insulate various contact devices from each other. A printed circuit board, which is covered by an insulating cover plate, may be arranged on the back of the base plate.

BRIEF DESCRIPTION OF DRAWINGS

Further practical embodiments and advantages of the system described herein are set forth below in connection with the drawings.

DETAILED DESCRIPTION OF VARIOUS EMBODIMENTS

Figure 1:
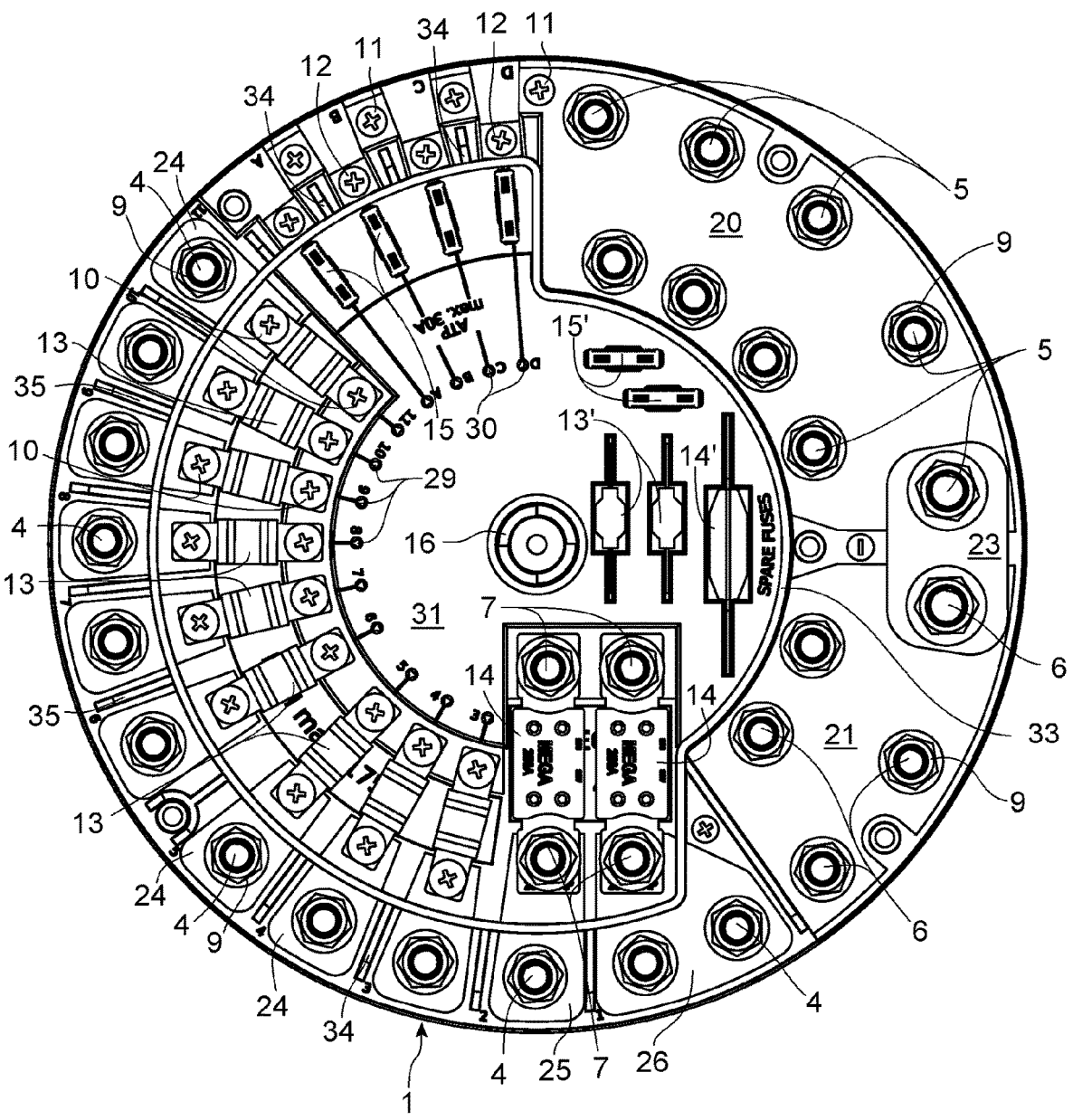
FIG. 1 shows a top view of a base plate of a first embodiment of a distribution box with components mounted on the distribution box without a cover according to the system described herein.
Figure 2:
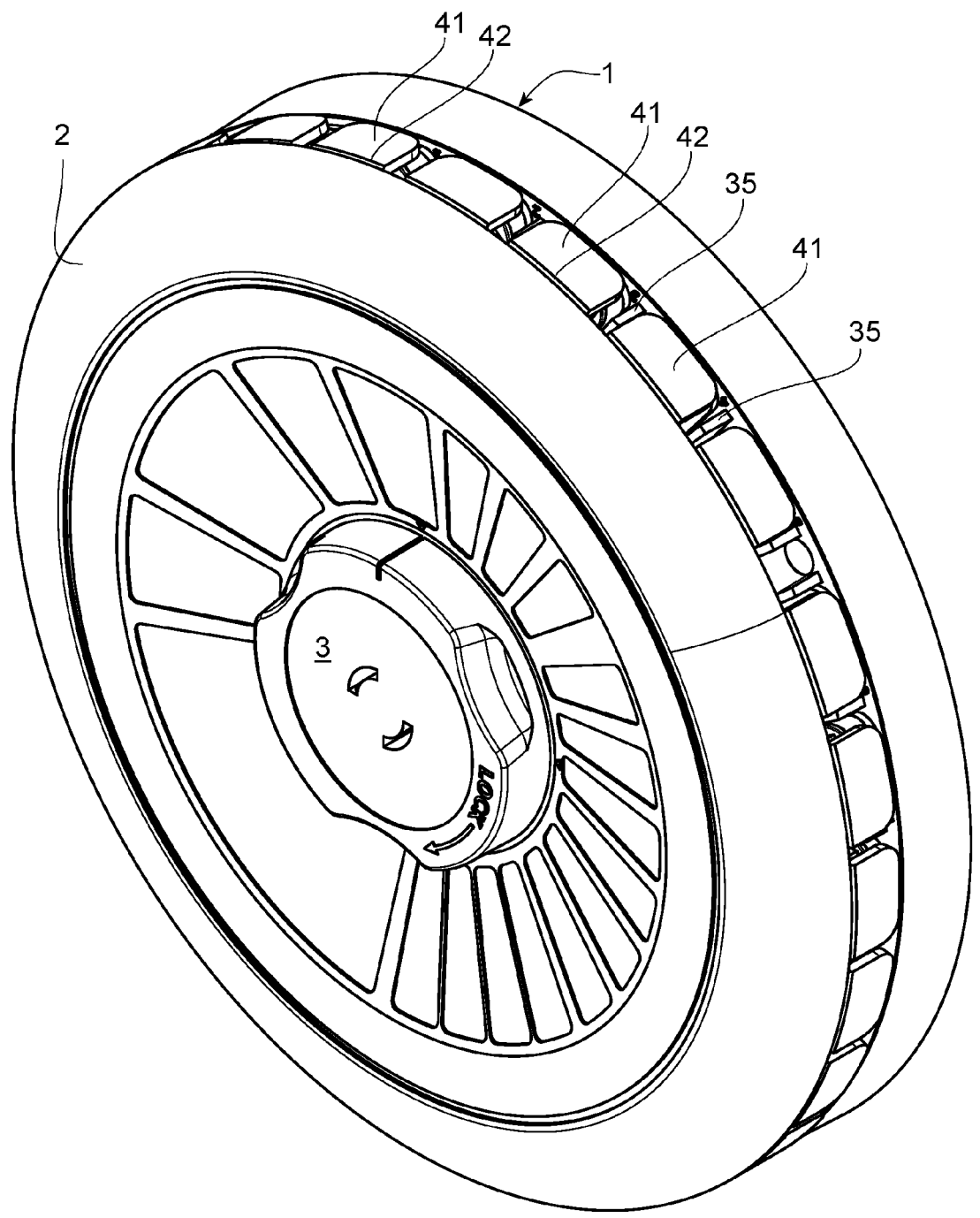
FIG. 2 shows a perspective side view of a distribution box with a cover and a twist knob for closing the cover according to the system described herein.

FIG. 1 shows a top view of a base plate 1 of a housing of an electrical distribution box with components mounted on the base plate 1. A cover 2 shown in FIG. 2 and a twist knob 3 for fastening the cover 2 are not shown in FIG. 1. The distribution box described herein forms a central fused distribution block of a DC circuit, for example of a boat or a motor home.

In the center, the base plate 1 has a receptor 16 for a central locking element 8 (FIG. 3) of the twist knob 3. The receptor 16 is designed in the form of a bayonet catch. By inserting and turning the locking element 8 of the twist knob 3, the locking element 8 is locked in the receptor 16 in the base plate 1 and holds the cover 2 firmly on the base plate 1. Strip fuses 13 for medium rated currents and strip fuses 14 for high rated currents are arranged on the base plate 1, as well as four flat plug-in fuses 15, which are configured for low rated currents. Furthermore, holders for spare fuses 13', 14', 15' of various types are provided in the central area of the base plate 1. The spare fuses 13', 14', 15' can replace one of the fuses 13, 14, 15 connected to the electrical devices in the event of a fuse failure.

The base plate 1 of the housing and the cover 2 have a circular contour in plan view. Various contact devices are arranged to the base plate 1 at intervals from one another. On the one hand, contact bolts 4, 5, 6, 7 can be seen, each of which has a thread for screwing on nuts 9. As described below, the contact bolts 4-7 are used to fasten different screw connectors. Contact screws 10 can also be seen, which are also used to fasten screw connectors. Finally, contact terminals 11, 12 are shown, each of which has clamping screws for clamping an electrical conductor. For reasons of clarity, not all elements with the same function are marked with reference signs.

In FIG. 1, a plurality of strip fuses 13 can be seen on the left-hand side, the screw connectors of the strip fuses 13 being fastened with two contact screws 10. The strip fuses 13 are used, for example, to connect electrical loads and may have a rated current of between 100 and 200 amperes. It is to be noted that strip fuses are manufactured with different rated currents, which are usually between 30 and 425 amperes.

The screw connectors of the strip fuses 13 located near the center of the housing are connected to the positive potential of the battery or batteries. The external contacts of the strip fuses 13 are connected to contact devices that allow for the connection of a positive cable of a load or a battery.

FIG. 1 also shows two larger strip fuses 14, which have a rated current of around 400 amperes. The strip fuses 14 may, for example, be connected to a solar module for charging the battery.

Figure 4:
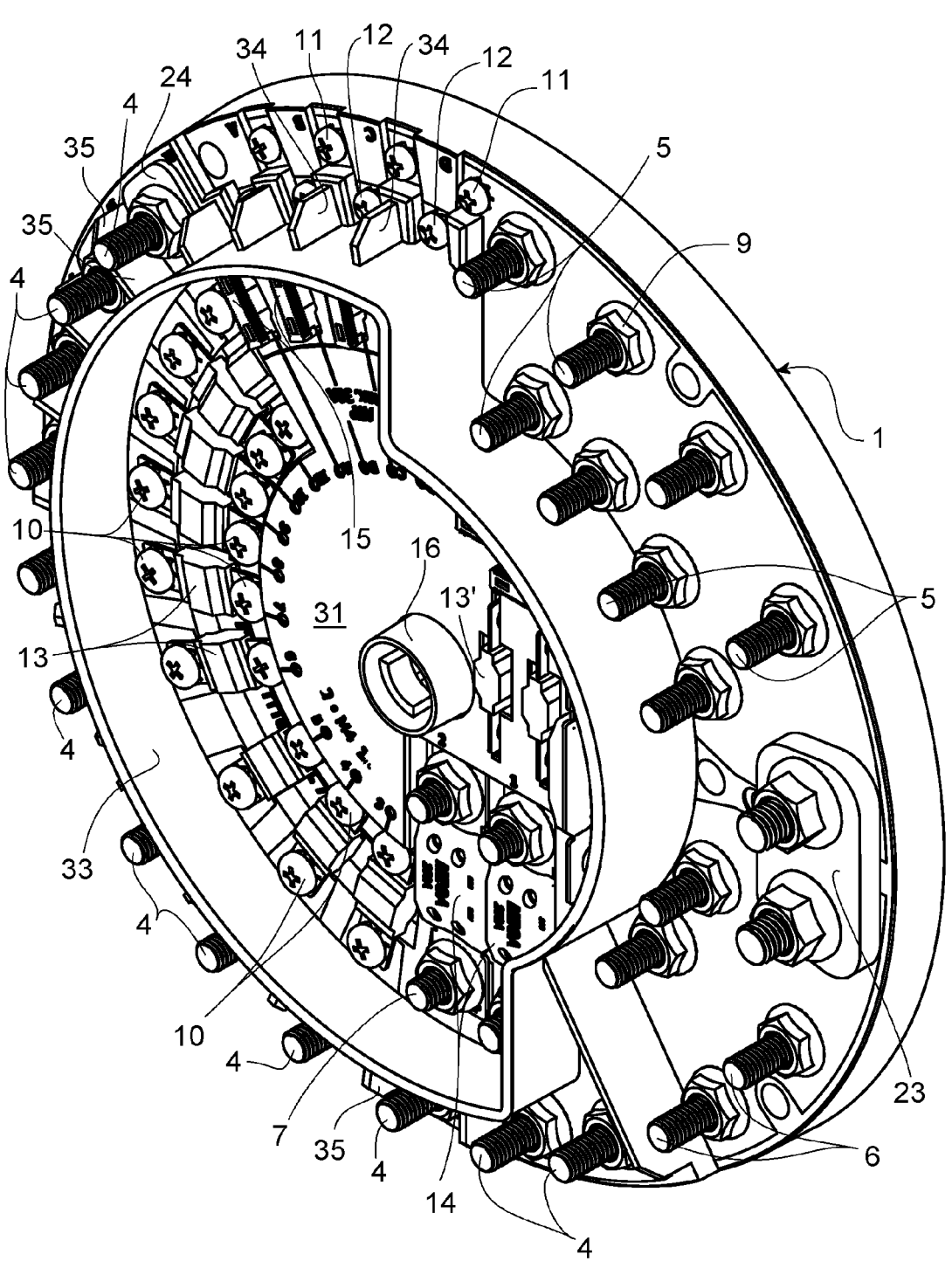
FIG. 4 shows a three-dimensional view of the distribution box from FIG. 1, without a cover, according to the system described herein.

Finally, in the upper area of the base plate 1 in FIG. 1, four flat plug-in fuses 15 can be seen to the left of the center, which are used to connect smaller loads. For this purpose, contact terminals 11, 12 are provided in the peripheral area of the base plate 1, which are electrically connected to the ground potential on the one hand and to the flat plug-in fuses 15 on the other. The outer contact terminals 11 in the immediate vicinity of the periphery of the base plate 1 are connected to the ground potential. The inner contact terminals 12, which are arranged along a circular line inside the outer contact terminals 11 and offset from them in the circumferential direction, form the positive contacts. Each flat plug-in fuse 15 is assigned an adjacent pair of contact terminals 11, 12, so that the two strands of a connecting cable of a load can be routed together to the adjacent contact terminals 11, 12. The internal contact terminals 12 lead to the positive potential via the flat plug-in fuses 15. The external contact terminals are at ground potential. Each internal contact terminal 12 is insulated from the neighboring one of the contact terminals 12 by lateral ribs 34 made of insulating material. FIG. 4 shows that the ribs 34 are components of the base plate 1 made of plastic material.

Figure 6:
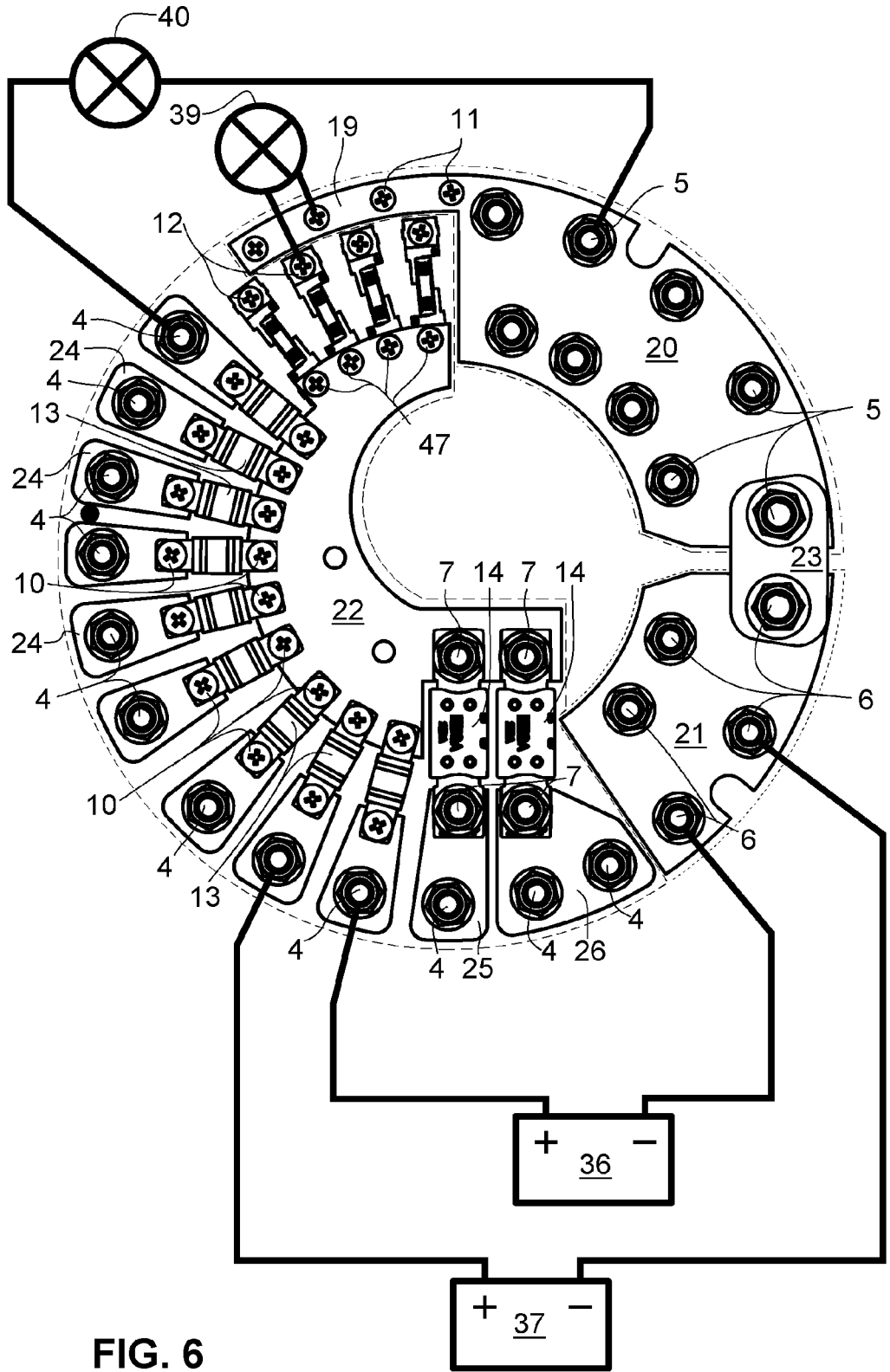
FIG. 6 shows an example of a circuit diagram of various contact devices of the distribution box of FIG. 1 to FIG. 5 according to the system described herein.

The contact bolts 4-7 arranged on the base plate 1 may be sorted according to the connected voltage potential and the connected devices. To explain this classification. FIG. 6 shows an electrical circuit diagram in which the main electrical components of the fused distribution block with fuses attached to the electrical components may be seen. Contact devices with the same potential are combined in the fused distribution block by electrically connecting the contact devices to busbars. Conventional fused distribution blocks are known to have straight busbars to which the fuses are connected side by side. To increase the connection density and reduce the size of the housing, the distribution box described herein uses flat, plate-shaped busbars made of metal, usually copper, to which the contact devices are connected.

A first busbar 20 combines the contact devices for connecting the ground cables of the loads. The busbar 20 is shown at the top right in FIG. 6. The contact devices for connecting powerful loads are formed by the contact bolts 5, to which cable lugs (not shown) at the ends of the ground cables of the loads can be screwed tight with one of the nuts 9. The busbar 20 has a narrow strip 19 on the left-hand periphery, which extends along a section of a ring and along the periphery of the base plate 1. This strip 19 is used to connect the ground conductors leading to the flat plug-in fuses 15 using the external contact terminals 11.

Figure 5:
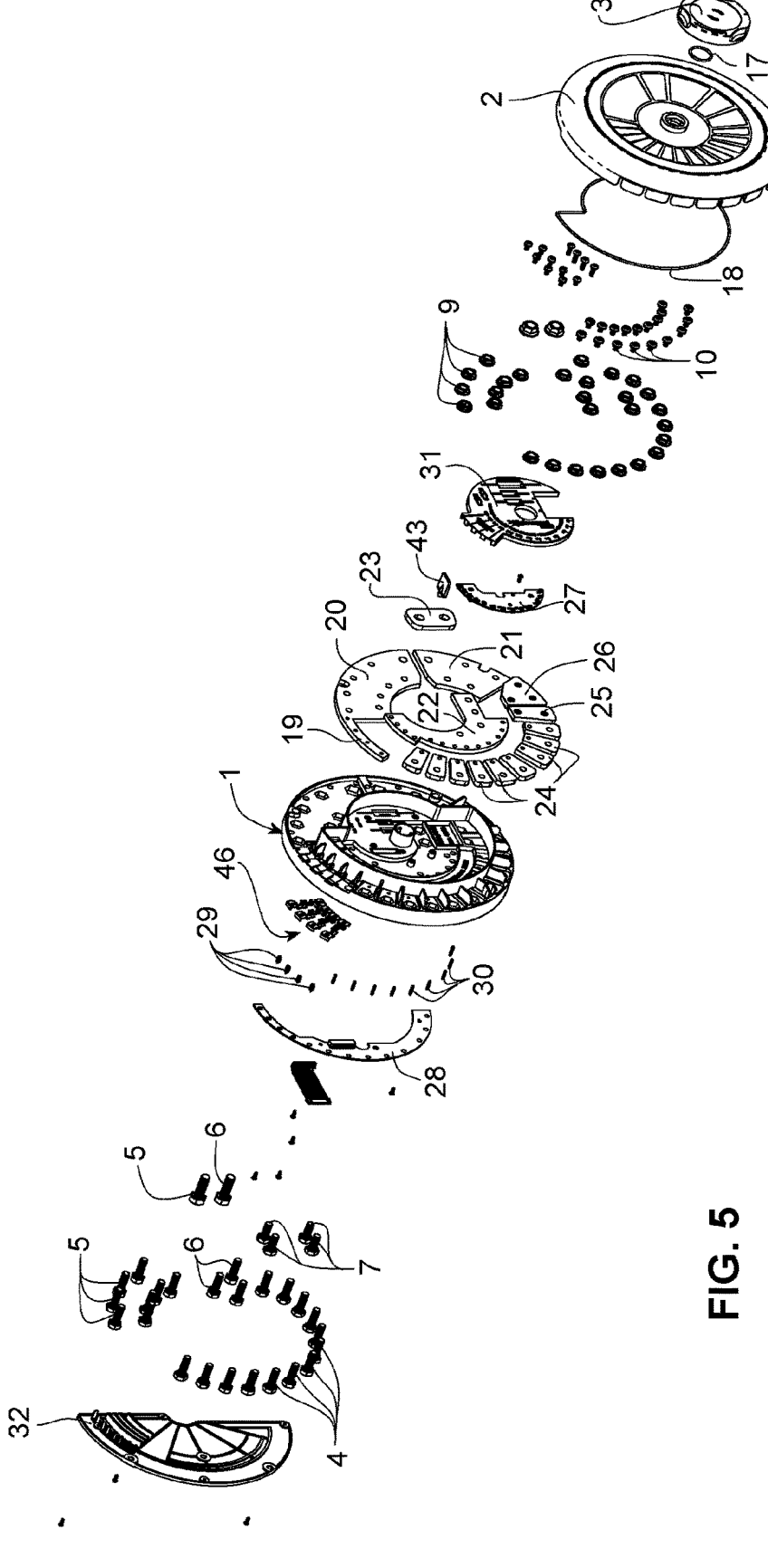
FIG. 5 shows an exploded view of components of a distribution box according to the system described herein.

A busbar 21 for connecting the ground cables of batteries 36, 37 (FIG. 6) is arranged on the right-hand periphery of the base plate 1 below the busbar 20. For this purpose, the contact bolts 6 are provided on the busbar 21, which may be of the same design as the contact bolts 5 for the ground cables of the loads. In the switching arrangement shown in FIG. 6, a jumper 23, which is formed by a flat copper element with two through-holes, is attached to the adjacent contact bolts 5, 6 of the busbars 20, 21. The jumper 23 establishes an electrical connection between the busbars 20, 21. However, if a current measurement of the discharge current of the battery is to be carried out, the jumper 23 may be disconnected between the busbar 20 for the ground connection of the loads and the busbar 21 for the ground connection of the batteries so that the current flowing at the busbar 21 can be measured. FIG. 5 shows an insulating strip 43 with a pin-shaped projection that can be inserted into a hole in the base plate 1 when the jumper is removed, so that the insulating strip separates and insulates the adjacent contact pins 5, 6 from each other when there is no jumper 23.

A further busbar 22 extends essentially in the left half of the housing in FIG. 6 and combines the positive potential. The positive conductors of the batteries and loads are connected to the busbar 22 via the fuses 13, 14, 15. The strip fuses 13, 14 are electroconductively connected to contact bolts 4 arranged essentially along the left and lower periphery of the housing.

As shown in FIG. 6 by thin frame lines, the contact devices of the distribution box are divided into three different zones, namely a first large zone for the positive contacts, outlined with long dashed lines, in which the busbar 22 and the fuses 13, 14, 15 connected to the busbar 22 as well as the positive contact terminals 12 and the connecting bolts 4 are located. A second zone is outlined with short dashed lines and is used to connect the ground cables of batteries to the contact bolts 6 in the lower right quarter of the housing in the plan view of FIG. 6. A third zone is located above and outlined with dotted lines and has the contact bolts 5 for the ground cables of the loads. If necessary—as mentioned—the jumper 23 shown in FIG. 6 can connect the two connection zones (the busbars 20, 21) with each other where the two connection zones can connect to ground cables.

Figure 3:
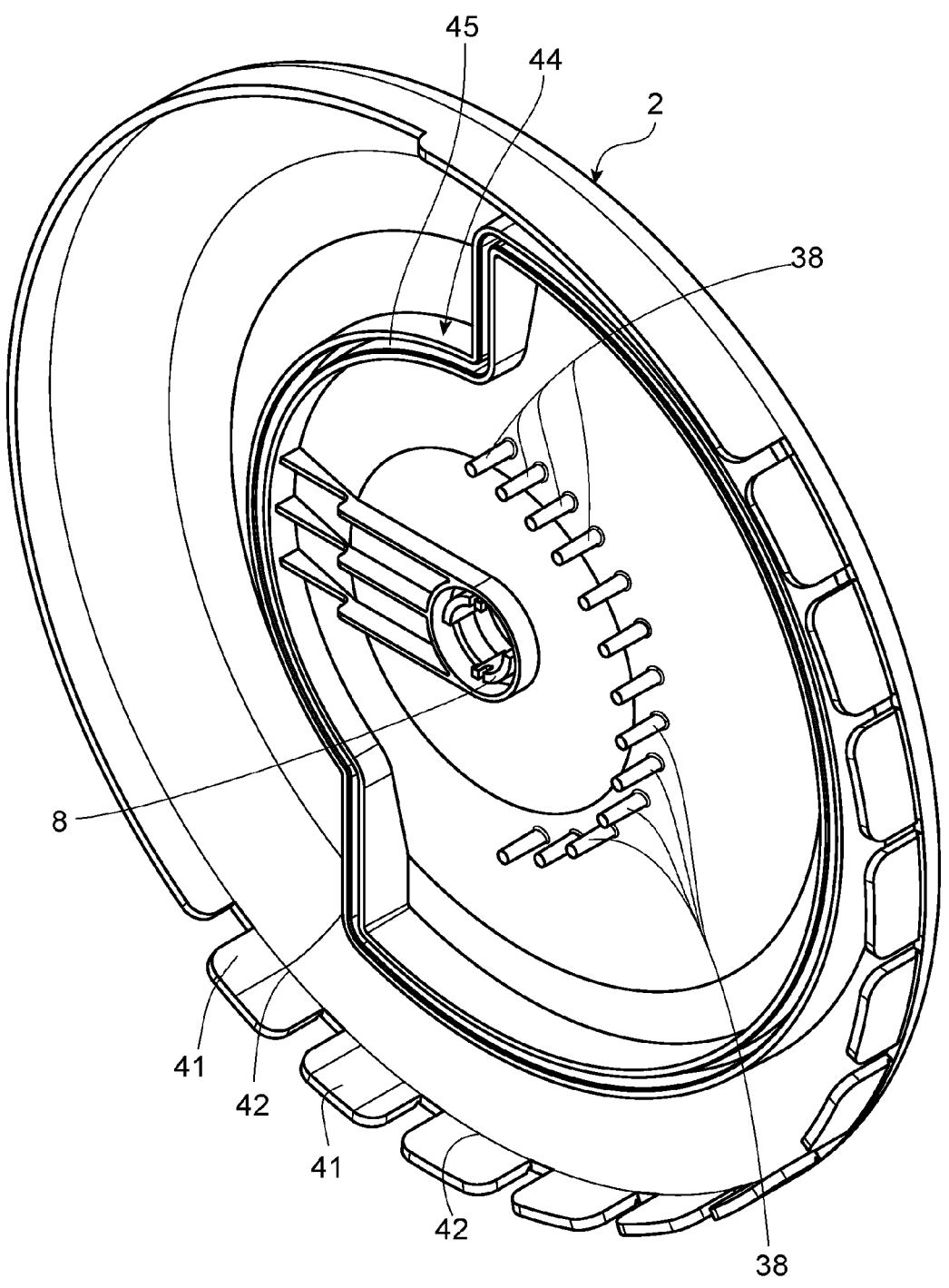
FIG. 3 shows a perspective view of an inside of a cover according to the system described herein.

The individual elements of the distribution box (without fuses) can also be seen in the exploded drawing in FIG. 5. However, it should be noted that FIG. 5 is not an assembly drawing. Some of the recognizable components, in particular the busbars 20, 21, 22 and other plate-shaped components may be inserted into the injection mold for the base plate 1 and inseparably connected to the base plate 1. FIG. 5 shows that a seal ring 17 surrounds the round locking element 8 (FIG. 3) of the twist knob 3 and seals the opening in the cover 2 through which the locking element 8 protrudes. A second seal 18 seals the outer periphery of the receiving space for the fuses 13, 14, 15 on the base plate in a gas-tight manner and interacts with corresponding sealing surfaces of the cover 2 and the base plate 1. In FIG. 4 in particular, it can be seen that the base plate 1 has a sealing wall 33 projecting out of the plane of the base plate 1, which delimits the area with the fuses 13, 14, 15 on the base plate 1. The seal 18 rests on the sealing wall 33 and makes it possible to seal the receiving space for the fuses 13, 14, 15, which is delimited by the base plate 1 and the cover 2 with the twist knob 3, against the environment in a gas-tight manner. FIG. 3 shows that the cover has a complementary double-walled sealing wall 44 with a receiving groove 45, into which the seal 18 (FIG. 5) may be inserted and into which the sealing wall 33 of the base plate 1 protrudes.

FIG. 5 shows that the contact bolts 4-7 may be designed as screws with hexagonal heads. The hexagonal heads are located on the back of the base plate 1 and the threaded bolts of the screws protrude through the busbars or conductor tabs, which have through holes. The through holes may have threads into which the external threads of the screws are screwed. Alternatively, the contact bolts 4-7 may be connected to the corresponding busbars or conductor tabs by riveting or soldering.

The busbars 20, 21, 22 and conductor tabs 24, 25, 26 are shown approximately in the center of FIG. 5. As mentioned, the electroconductive elements may be embedded in the material of the base plate 1. The respective contact bolts 4-7 are formed by screws which are screwed into corresponding threaded holes in the busbars 19, 21 or the conductor tabs 24, 25, 26, with the head of the screw-shaped contact bolts 4-7 resting against the rear of the respective one of the busbars 19, 21 or the conductor tabs 24, 25, 26. The protruding strip 19 of the busbar 20 has threaded holes to which the screws for forming the clamping contacts 11 are screwed.

The contacts of the strip fuses 13 for medium currents located on the outside near the periphery of the base plate 1 are connected to conductor 24. For this purpose, the conductor tabs 24 have threaded holes at inner ends into which the contact screws 10 are screwed in order to clamp the screw connectors of the strip fuses 13. Corresponding threaded holes for the corresponding contact screws 10 are provided along the left curved periphery of the busbar 22. Threaded holes into which the contact bolts 4 are screwed are provided at the outer end of the conductor tabs 24. Each of the conductor tabs 24 is electrically insulated on the base plate 1. In particular, FIG. 4 shows that two ribs 35 made of insulating material are arranged laterally of the contact bolts 4, which prevent unwanted contact between two adjacent contact bolts 4. Like the ribs 34, the ribs 35 are molded onto the sealing wall 33 of the base plate 1.

The conductor tabs 25, 26 for the strip fuses 14 with a high rated current differ from the conductor tabs 24 for the medium strip fuses 13. The first conductor tab 25 has a larger cross-section than the conductor tabs 24 due to the greater current flow and is used to connect a cable lug. For this purpose, the conductor tab 25 has one of the bolts 4 at an outer end thereof. One of the bolts 7 at the radially inner end of the conductor tab 25 is used to connect a fuse contact. A second fuse contact is screwed to the busbar 22 via one of the bolts 7.

The second conductor tab 26 is used to connect two cable lugs. For this purpose, the second conductor tab 26 has two of the bolts 4 on the radially outer periphery thereof. Radially on the inside, the conductor tab 26 has one of the bolts 7 for a contact of the strip fuse 14.

FIG. 5 also shows circuit boards 27, 28. The circuit boards 27, 28 may be printed circuit boards (PCBs). The circuit board 27 on the front of the base plate 1 is provided with electrical conductor paths, which connect control LEDs 29 to the flat plug-in fuses 15 (FIG. 1) in such a way that if one of the flat plug-in fuses 15 fails, the one of the LEDs 29 assigned to the failing one of the flat plug-in fuses 15 lights up. More precisely, the circuit board 27 switches each of the four control LEDs 29 in parallel with one of the four flat plug-in fuses 15. If one or more of the flat plug-in fuses 15 are interrupted, corresponding one(s) of the control LEDs 29 are energized and light up. In a similar way, the printed circuit board 28 arranged at the rear of the base plate 1 connects control LEDs 30 for the strip fuses 13.

FIG. 3 shows the inside of the cover 2 with thirteen pin-like protrusions 38 (lines to the reference sign are only attached to eight of the thirteen protrusions). The cover 2 is made of transparent plastic and the pin-like projections 38 are also transparent. When the housing of the distribution box 1 is closed, free ends of the projections 38 lie directly above a corresponding one of the LEDs 29, 30 in each case, so that when one of the LEDs 29, 30 lights up, a luminous spot is formed in the area in which a corresponding one of the pin-like projections 38 is connected to the cover 2. It is therefore possible to clearly identify on the outside of the cover 2, which fuse has failed. Each of the pin-like projections 38 thus forms a light conductor that directs a light signal of an associated one of the LEDs 29, 30 to the outside of the cover 2.

Cover plates 31, 32 cover the circuit boards 27, 28 and protect the circuit boards 27, 28 from unwanted contact with other electrical conductors. Like the base plate 1, the cover 2 and the twist knob 3, the cover plates 31, 32 are also made of electrically insulating and resistant plastic material.

The cover plate 31 arranged inside the housing also covers the inner area of the busbar 22 and the plug contacts 46 (FIG. 5) for the flat plug-in fuses 15.

A cable lug of a ground cable can be fastened to each of the contact bolts 5 of the busbar 20 and to each of the contact bolts 6 of the busbar 21 using one of the nuts 9. Due to the arrangement of contact bolts 5, 6 along two concentric circular lines and the offset of radially outer one of the contact bolts 5, 6 to the inner one of the contact bolts 5, 6 in the circumferential direction, a large number of ground cables can be connected to the busbars 20, 21. Contact lugs may also be connected to neighboring one of the contact bolts 5, 6, to which the jumper 23 is fixed.

A correspondingly high number of the contact bolts 4 for the positive contacts via the fuses 13, 14 is available in the left half of the housing periphery in FIG. 1 and FIG. 6. In addition, pairs of the contact terminals 11, 12 for the connection of loads via the flat plug-in fuses 15 are arranged in the upper region.

As an example, FIG. 6 shows the connection of a load 39 to the second pair of contact terminals 11, 12 seen from the left and of a further load 40 to one of the contact bolts 5 for the ground line and one of the contact bolts 4 for the positive line. which is coupled to one of the strip fuses 13.

FIG. 6 also shows the connection of two batteries 36, 37, each via one of the contact bolts 6 for the battery ground and one of the contact bolts 4 for the positive terminal, which in turn is protected by one of the strip fuses 13.

Since. depending on the application, not all available contact devices are occupied by connections, the cover 2 has cover tabs 41 (FIGS. 2 and 3) around the circumference of the cover 2, which extend from the external side of the cover 2 towards the base plate 1 in the area of the periphery of the cover 2. Each of the cover tabs 41 lies essentially between two adjacent ribs 35 of the base plate 1. The end of each of the cover tabs 41 that is remote from the base plate 1 is connected to the cover 2 via a linear predetermined breaking point 42. In the area of the predetermined breaking point 42, the material thickness of the cover 2 is reduced so that each of the cover tabs 41 can be easily broken out if a cable is to be connected to a corresponding one of the contact bolts 4 located behind the cover.

Figure 7:
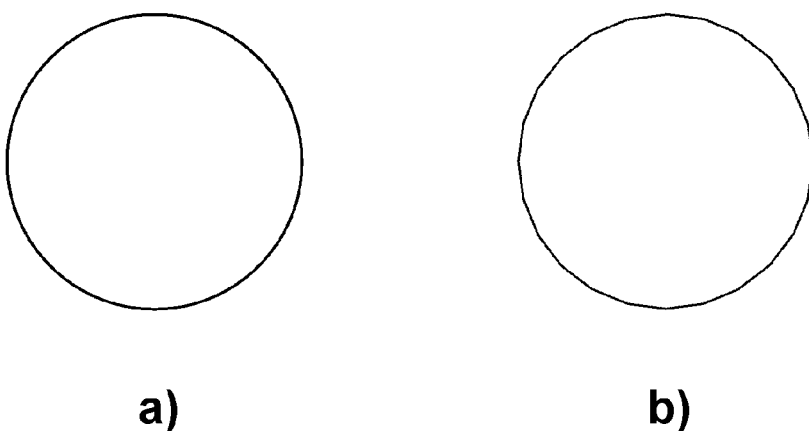
FIG. 7 shows four possible alternative contours of a housing of a distribution box in plan view according to the system described herein.
Figure 7:
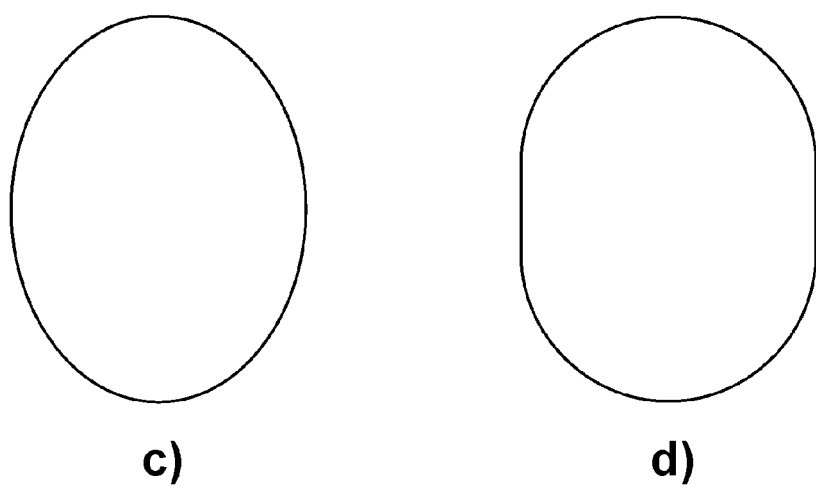

The basic shape of the housing shown in the figures above is circular. The basic shape has proved to be very effective in practice to allow the cables to be fed to the fused distribution block in a star shape. The basic shape of the housing can be seen in FIG. 7 in illustration a). Illustration b) shows an equally suitable basic shape of the housing in which, instead of a circular contour of the periphery of the housing, a contour with twenty-four straight sections has been selected, having an angle of 15° to one another. A contact bolt or a pair of contact bolts may be arranged in the region of each straight section of the periphery. If there is more space available for the housing in one direction, e.g. the vertical direction, than in the perpendicular direction, the housing may also have an oval basic shape, as shown for example in illustration c) of FIG. 7. The basic oval shape may also consist of several short, straight sections. Alternatively, the basic shape of the contour of the housing may consist of two opposing semicircles that are drawn apart and connected by straight periphery sections. The basic shape can be seen in illustration d) of FIG. 7.

Figure 8:
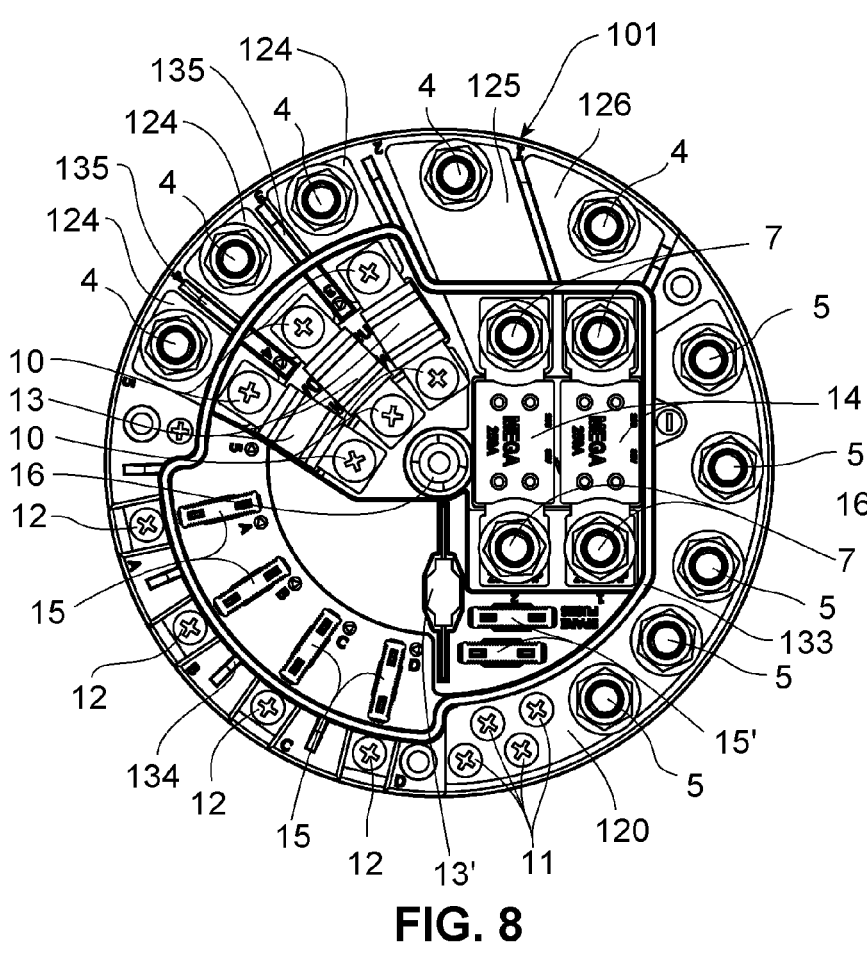
FIG. 8 shows a top view of a base plate of a second compact embodiment of a distribution box with components mounted on the distribution box without a cover according to the system described herein.
Figure 9:
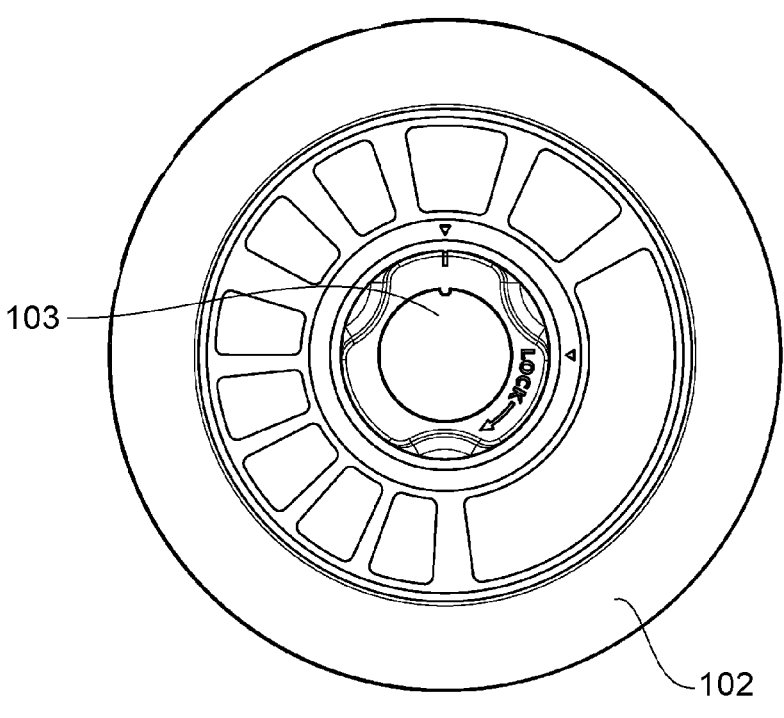
FIG. 9 shows a top view of the cover of the distribution box from FIG. 8 according to the system described herein.
Figure 10:
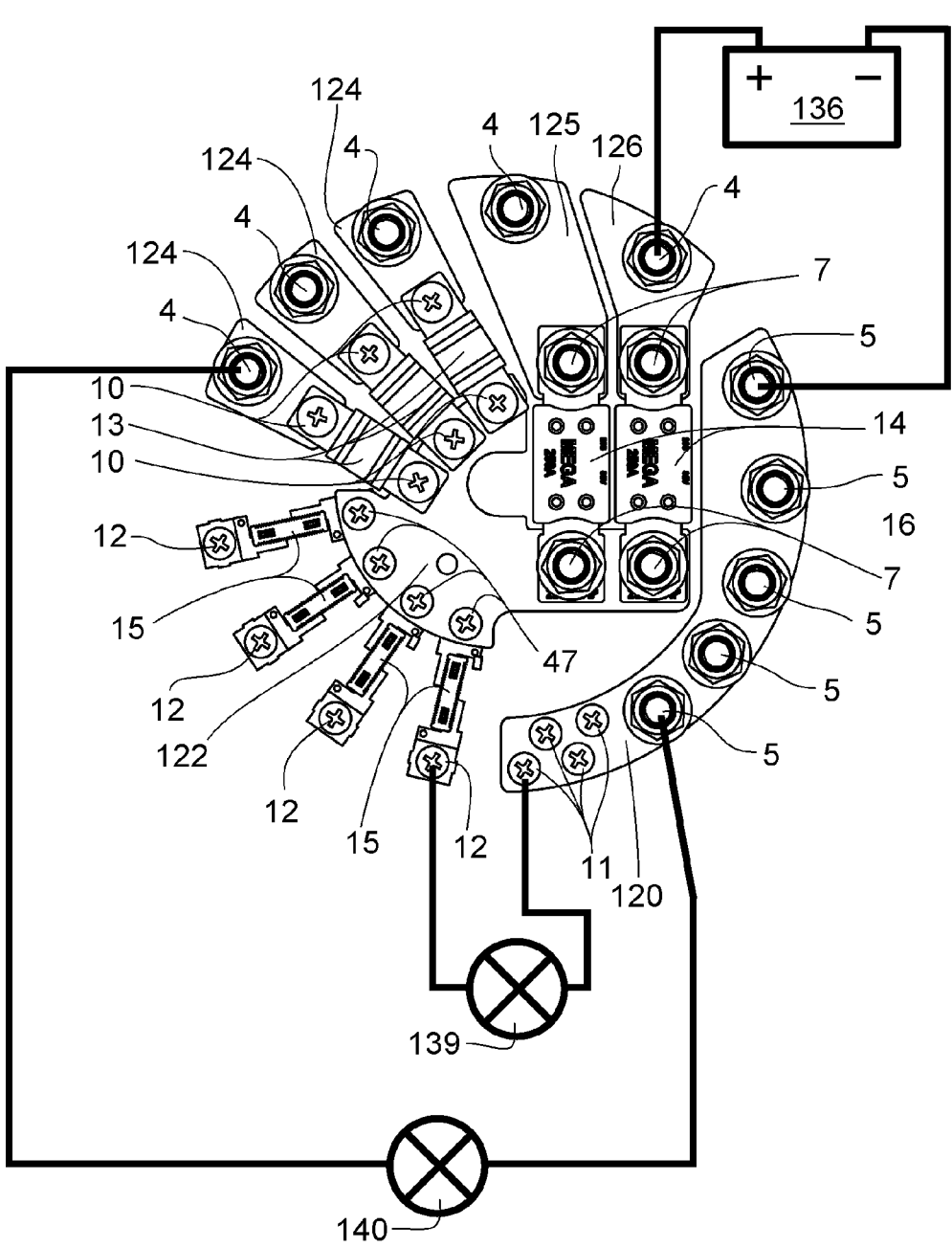
FIG. 10 shows an example of a circuit diagram of contact devices of the distribution box from FIG. 8 and FIG. 9 according to the system described herein.

FIGS. 8 to 10 show various views of a second, more compact embodiment of a distribution box of the type described herein. Identical components to the components of the first embodiment in FIGS. 1 to 6 are provided with the same reference signs. Functionally corresponding components with a different geometry have reference numbers corresponding to the reference signs in FIGS. 1-5 increased by the value 100.

The base plate 101 of the second embodiment of the distribution box shown in FIG. 8 also has a round basic shape, albeit with a considerably reduced diameter. The base plate 101 is designed to accommodate a smaller number of fuses. The distribution box shown in FIGS. 8 to 10 has three of the strip fuses 13 for medium rated currents and two of the strip fuses 14 for high rated currents. The distribution box also has four of the flat plug-in fuses 15. In the central region of the base plate 101, holders for one of the spare fuses 13' of a strip fuse for medium rated currents and for two of the spare flat plug-in fuses 15' are provided.

In this embodiment, the round base plate 101 is also covered with a cover 102 (FIG. 9), which is connected to the receptor 16 of the base plate 101 by a twist knob 103.

The arrangement of the busbars and conductor tabs shown in FIG. 10 differs in the second embodiment according to FIGS. 8 to 10 from that of the first embodiment. As in the first embodiment, all busbars and conductor tabs are accommodated within the contour of the round base plate 101 (FIG. 8). A busbar 120 for the ground potential extends in FIG. 10 in the lower right quarter, which corresponds to the lower right quadrant of the base plate 101 (FIG. 8). In contrast to the preceding embodiment, in this embodiment only one busbar 120 is provided for ground connections. In this embodiment, the four clamping screws. which form the contact terminals 11 for the ground connections of the loads protected via the flat plug-in fuses 15, are jointly located at the lower end of the busbar 120 for the ground potential in FIG. 10. Five of the contact bolts 5 for the ground connection of further power sources or loads are arranged along the outer right periphery of the busbar 120, which largely corresponds to the outer right periphery of the base plate 101 in FIG. 8.

A busbar 122 for the positive potential has a C-shaped basic form. The busbar 122 has two of the contact bolts 7 at the right-hand end of the lower leg (FIG. 10), each for connecting one of the strip fuses 14 for high rated currents. Four contact screws 47 are screwed into the lower periphery of the busbar 122, with which the plug-in sockets for the flat plug-in fuses 15 are screwed tight. On the outer periphery of the upper leg of the busbar 122 there are threaded holes for three of the contact screws 10, with which the strip fuses 13 for medium rated currents are screwed tight.

Conductor tabs 124, 125 and 126 for connecting the contact bolts 7 and the contact screws 10, to which the strip fuses 14, 13 are attached, with outer contact devices along the bent periphery of the base plate 101, namely the contact bolts 4, are designed in such a way that the contact bolts 7 and the contact screws 10 fit into the circular basic shape of the base plate 101 without touching each other. In this way, the conductor tabs have a large cross-section through which current flows despite a small design of the conductor tabs. In the lower left quadrant of the base plate 101 (FIG. 8), the contact terminals 12 are connected directly to the sockets for holding the strip fuses 15.

In this way, the distribution box in FIGS. 8-10 also achieves an optimum shape with a compact geometry for the reduced number of connections and fuses. The external contact devices (the contact bolts 4, 5 and the contact terminals 12) are arranged at almost regular intervals along the bent periphery of the housing on the base plate 101. Each of the contact bolts 4, 5 and the contact terminals 12 is associated with one of the contact screws 10, 47, and the contact bolts 7 that is displaced towards the center of the housing, so that the fuses 13, 14, 15 can be connected to the contact bolts 4 and the associated ones of the contact screws 10, 47, and the contact bolts 7.

Similar to FIG. 6 of the first embodiment. FIG. 10 also shows loads 139, 140 connected via the distribution box and a battery 136 connected to the distribution box. In this embodiment, the battery 136 is connected to the positive terminal via the contact bolt 4 to the strip fuse 14 for high rated currents and is fused by the strip fuse 14. The negative terminal of the battery 136 is connected to the uppermost one of the contact bolts 5 of the busbar 120 for the ground potential in FIG. 10. A load 140 is connected to the lowest one of the contact bolts 5 of the busbar 120 for the ground potential and via the contact bolt 4 to the strip fuse 13 for medium rated currents. A second load 139 is fused via a flat plug-in fuse, the fuse 13, and connected to the busbar 122 for the positive potential via the contact terminal 12. The contact terminal 11 connects the load 139 to the busbar 120 for the ground potential.

As in the preceding embodiment, the ground busbar 120 and the conductor tabs 124, 125, 126 are also partially embedded in the material of the base plate 101 in this embodiment. The busbar 122 with positive potential is completely covered by insulating material of the base plate 101. Furthermore, the ribs 134, 135 are also provided in this embodiment, which insulate adjacent one of the contact bolts 4 and the contact terminals 12 with different potentials. Also in this embodiment. the receiving space for the fuses 13, 14, 15 on the base plate 101 is surrounded by a sealing wall 133 protruding from the material of the base plate 101, which interacts with a double-walled sealing wall (not shown) in the cover 102.

The embodiment of FIGS. 8-10 also achieves a very compact design of the distribution box, where the connection cables may be routed in a radial direction and in a star shape to the housing of the distribution box.

The features of the invention disclosed in the present description, in the drawings and in the claims may be essential, both individually and in any combination, for the realization of the invention in its various embodiments. The invention is not limited to the described embodiments. It may be varied within the scope of the claims and taking into account the knowledge of the person skilled in the art.

The invention claimed is:

1. An electrical distribution box, comprising:
a housing having, in plan view, at least partially a round or oval basic shape with a bent housing periphery that is curved or polygonal; and
a plurality of contact devices, wherein a plurality of fuses are mountable in the housing and electroconductively connectable to the contact devices and wherein a first subset of the contact devices are arranged at intervals from one another along the bent housing periphery, each first subset of the contact divices corresponding to at least one of a second subset of the contact divices which is displaced towards a center of the housing, so that at least some of the fuses are connectable to one of the first subset of the contact devices and a corresponding one or more of the second contact devices.

2. The electrical distribution box according to claim 1, wherein the housing has an oval basic shape and the housing periphery has straight sections lying opposite one another, in which several of the contact devices are arranged.

3. The electrical distribution box according to claim 1, further comprising at least one of the following:
an electrical jumper; or
an LED.

4. The electrical distribution box according to claim 1, wherein at least one busbar is arranged in the housing, an outer periphery of the busbar following the housing periphery and the busbar being electroconductively connected to the contact devices at predetermined intervals along the outer periphery of the busbar.

5. The electrical distribution box according to claim 4, wherein the busbar includes at least one of the following features:
a first row of equidistant ones of the contact devices are arranged in an outer region near the outer periphery of the busbar;
a second row of equidistant ones of the contact devices are arranged in an inner region at a greater distance from the outer periphery of the busbar; or
external and internal ones of the contact devices are offset from each other in a circumferential direction of the bent housing periphery.

6. The electrical distribution box according to claim 4, further comprising:

a first busbar configured to be connected to at least one ground cable of at least one battery;
a second busbar configured to be connected to at least one ground cable of at least one load; and
an electrical jumper that electroconductively connects the first busbar and the second busbar.

7. The electrical distribution box according to claim 1, wherein at least one of the contact devices is at least one of the following:
a contact bolt;
a contact terminal; or
a contact screw.

8. The electrical distribution box according to claim 1, further comprising:
at least one printed circuit board or conductor tab which electroconductively connects components arranged in the housing to one another.

9. The electrical distribution box according to claim 7, wherein at least one of the contact devices is a contact bolt that is formed by at least one busbar, printed circuit board or conductor tab having at least one threaded hole into which a screw is screwed.

10. The electrical distribution box according to claim 1, wherein the housing includes a base plate and a removable cover.

11. The electrical distribution box according to claim 1, further comprising:
at least one electrically insulating cover plate.

12. The electrical distribution box according to claim 10, wherein a seal is arranged between the base plate and the cover of the housing to seal from the environment an area of the base plate to which the fuses are attachable.

13. The electrical distribution box according to claim 10, wherein the cover has a twist lock that can be locked to a receptor of the base plate.

14. The electrical distribution box according to claim 10, wherein the cover has at least one light conductor which extends into the housing and which has a free end located near an LED.

15. The electrical distribution box according to claim 10, wherein the cover has at least one cover tab for one of the contact devices in an area of the housing periphery and the cover tab is attached to the cover using a predetermined breaking point.

16. The electrical distribution box according to claim 10, wherein the base plate has ribs made of insulating material between adjacent ones of the contact devices near the housing periphery.

17. The electrical distribution box according to claim 10, wherein the base plate includes a coupling device to which an insulating strip is attachable between two of the contact devices.

18. The electrical distribution box according to claim 10, wherein the base plate is made of plastic.

19. The electrical distribution box according to claim 18, wherein at least one busbar, printed circuit board, conductor tab, or one of the contact devices is embedded in the plastic of the base plate.

20. The electrical distribution box according to claim 1, wherein a central area of the housing is configured to accommodate spare fuses.

\* \* \* \* \*